United States Patent [19]

Huret, deceased et al.

[11] Patent Number: 4,484,902

[45] Date of Patent: Nov. 27, 1984

[54] DRIVE PULLEY IN PARTICULAR FOR THE DISTANCE RECORDER OF A BICYCLE

[75] Inventors: Roger Huret, deceased, late of Nanterre, France; Alain P. B. Huret, legal representative, Bougival, France

[73] Assignee: Huret et ses Fils, Nanterre, France

[21] Appl. No.: 356,489

[22] Filed: Mar. 9, 1982

[30] Foreign Application Priority Data

Mar. 23, 1981 [FR] France ................................. 8105716

[51] Int. Cl.³ .............................................. F16H 55/48
[52] U.S. Cl. ...................................... 474/195; 74/12; 74/15; 280/289 R; 474/174; 474/190
[58] Field of Search ...................... 74/15, 12; 474/195, 474/174, 166, 190, 273, 902, 57, 56; 280/289 R

[56] References Cited

U.S. PATENT DOCUMENTS

| | | | |
|---|---|---|---|
| 1,311,339 | 7/1919 | Freed | 74/15 |
| 1,498,107 | 6/1924 | Montgomery | 74/15 |
| 1,848,060 | 3/1932 | Gustafson | 74/12 |
| 3,995,508 | 12/1976 | Newell | 474/56 |
| 4,212,482 | 7/1980 | Rasmussen | 74/12 |
| 4,252,029 | 2/1981 | Huret | 474/174 |

FOREIGN PATENT DOCUMENTS

| | | | |
|---|---|---|---|
| 1004860 | 5/1947 | France | 474/56 |
| 981230 | 5/1951 | France | 474/56 |

*Primary Examiner*—Leslie A. Braun
*Assistant Examiner*—Dwight G. Diehl
*Attorney, Agent, or Firm*—Trexler, Bushnell & Wolters, Ltd.

[57] ABSTRACT

The pulley comprises an annular portion which extends radially beyond a grooved ring around which a belt for driving the recorder extends. In order to permit fixing this pulley to a wheel hub flange of variable diameter by means of nose portions, each nose portion is formed at the end of an arm whose other end is pivotally mounted on the ring and can be retained in any of a plurality of angular positions which are defined by steps provided on the edges of slots in which studs formed on each of the arms are guided.

12 Claims, 4 Drawing Figures

DRIVE PULLEY IN PARTICULAR FOR THE DISTANCE RECORDER OF A BICYCLE

DESCRIPTION

The present invention relates to a drive pulley in particular for the distance or kilometer recorder of a cycle or motocycle adapted to be fixed in a position adjacent to a flange of a wheel hub coaxially of said hub and comprising a grooved ring on which are provided three axially extending lugs the free end of which is provided with a nose portion adapted to engage the periphery of the hub flange.

In known drive pulleys of this type, which are as a rule of a moulded plastics material, the three hooking nose portions provided at the free end of the respective lugs must define a circle whose diameter is roughly equal to the diameter of the flange. When the two diameters are different, the pulley may, if necessary, be mounted by employing an expedient which is hardly satisfactory consisting, for example, in the use of three metal bands one end of which is connected to the pulley whereas at the other end there is formed a folded portion hooked to the spokes so as to be adapted to the geometry of the wheel.

It has already been proposed to construct rings forming a pulley provided with a plurality of groups of three lugs which, in each group, correspond to a different flange diameter, the lugs other than the three lugs used being then eliminated upon assembly by means of a cutting tool. Apart from the fact that this results in a waste of material, this arrangement requires much attention on the part of the fitter who might make an irreparable mistake in the choice of the lugs to be conserved.

An object of the invention is to provide a drive pulley which is relatively simple to manufacture and yet permits a reliable adaptation to the different flange diameters. In this pulley, there is formed on the ring a flat outwardly extending annular member on which there is articulated at each of three circumferentially evenly spaced apart positions, an end portion of an arm whose opposite end portion carries the axially extending lug, said arm being capable of being selectively retained in one of a plurality of angular positions each of which corresponds to a different diameter of an imaginary circle concentric with the ring on which the nose portion of the lug is located.

By providing a sufficient extent for the angular movement of each pivotal arm, with retaining points being formed in consequence, it is possible to define, for the various positions of the three hooking nose portions, circles of different diameter in a suitable number for corresponding to all the diameters of hub flanges encountered in practice.

Each articulated arm, which is itself preferably of a plastics material as the pulley, may have a flat shape so as to come into sliding contact with a smooth face of the ring and include on the side thereof which is opposed to the axial lug at least one stud guided in a slot or groove formed in the side of the flat ring which is opposed to the smooth side, said slot having the shape of an arc of a circle centered on the axis of articulation of the arm. The slot, or each slot, is advantageously toothed or stepped so as to define required angular positions of the arm which may be identified by a suitable graduation marked for example on the smooth side of the ring.

According to a preferred arrangement, each arm is provided with two studs located respectively in the region of the end of the lug and in an intermediate position between the lug and the articulated end, the intermediate stud being guided in either one of two slots or grooves formed in the ring, on each side of the articulation axis of the arm to which respectively correspond a range of adjustment of the lug located between the two edges of the ring and another range outside the ring.

The invention will be explained merely by way of example in the ensuing description with reference to the accompanying drawing, in which.

Figure 1:
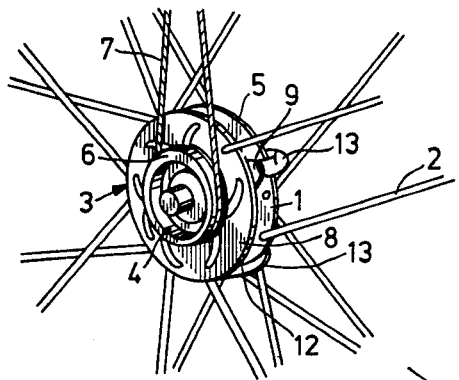
FIG. 1 is a diagrammatic perspective view of a hub flange of a wheel of a bicycle in the vicinity of which flange there is fixed a drive pulley according to the invention by means of nose portions engaged with the circular edge of the flange.

FIG. 1 shows a flange 1 of circular contour on the periphery 5 of which is fixed in a conventional manner one of the ends of a number of spokes 2 of a bicycle wheel. In a position adjacent to the outer side of the flange 1, is mounted, concentrically with the flange, a pulley 3 of moulded plastics material which comprises a ring 4 around a groove 6 of which extends a belt 7 for driving a distance or kilometer recorder (not shown). The flank of the groove 6 of the ring 4 which is adjacent to the flange 1 is extended radially outwardly in the form of a flat annular member or portion 8 which constitutes a unit 4,8 with said ring 4 and on which unit are fixed, at positions I,II,III spaced circumferentially 120° apart, three arms 9 which are also of plastics material. At the free end 11 of each of the arms is formed a lug 12 which extends axially and whose free end portion is provided with a hooking means 13 in the shape of a nose portion which is engaged with the circular edge 5 of the flange 1 and thus maintains the pulley 3 in a centered position.

The radial position of the nose portions 13 is determined selectively in such manner as to correspond to the diameter of the flange 1 with which they are engaged, owing to the pivotal mounting of the arms 9.

For this purpose, each arm, which has a flat shape, comprises at the end 14 thereof and on the side 16 which is opposed to the lug 12, a pivot pin 17 which is engaged in said unit 4,8, i.e. in the ring 4, in a recess 18 formed in the inner edge 10 of the latter and is radially and axially retained therein, owing, on one hand, to a narrowing of the access opening of the recess whose two edges, which are rendered flexible by the presence of two adjacent recesses 19, may be spread elastically apart upon assembly and, on the other hand, to the T-shape of the end portion of the pin 17 opposed to the side 16 in sliding contact with the adjacent planar side 20 of the annular member 8.

Figure 2:
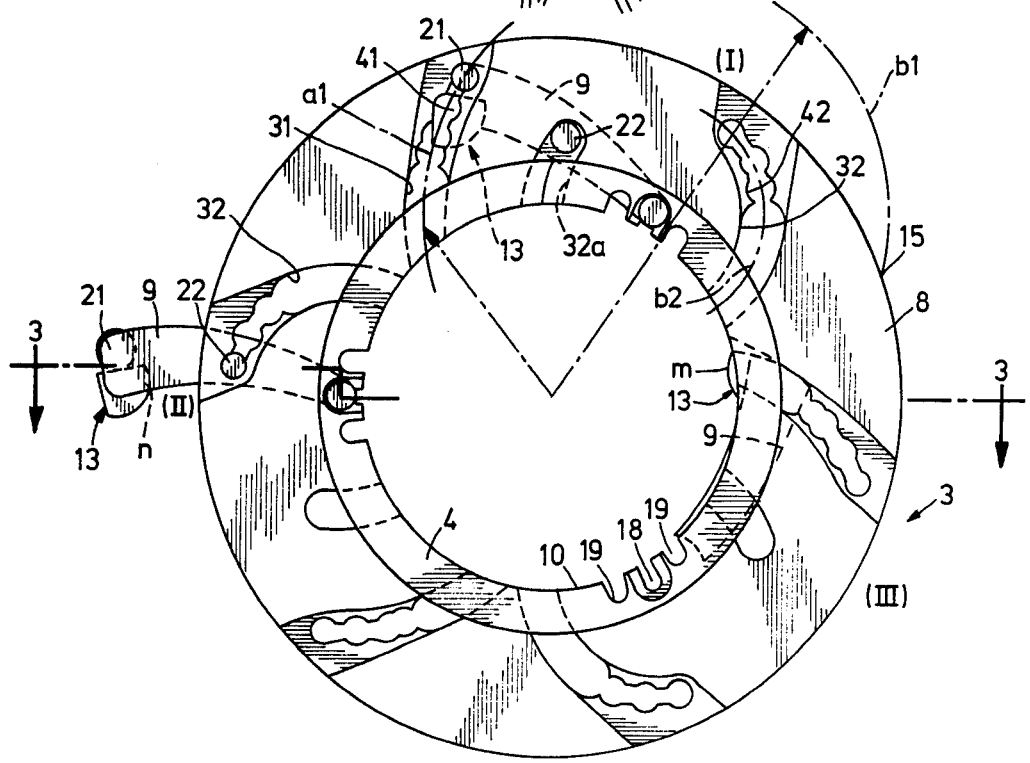
FIG. 2 is an elevational view, to an enlarged scale, of the pulley.

Projecting from this side 16 are two studs 21, 22 which are respectively disposed in the region of the lug 12 and in an intermediate position between this lug and the pin 17. The end stud 21 may be inserted in a slot 31 of the annular member 8 and retained therein in a position determined selectively by teeth or steps 41 formed on the edges of this slot. As concerns the intermediate stud 22, it may either be inserted in a slot 32 opposed to the slot 31 relative to the pin 17 and retained therein in a position determined selectively by teeth or steps 42 formed on the edges of the slot 32, when the end of the arm 9 carrying the lug 12 and the stud 21 is located beyond the extreme edge 15 of the annular member 8, as is the case of the position II of FIG. 2, or be guided in a smooth slot 32a which is located, relative to the pin 17, on the same side as the toothed or stepped slot 31 when the end stud 21 is received in the latter, which is the case of the positions I and III of FIG. 2.

The three slots 31, 32, 32a have of course the shape of arcs of a circle the center of which coincides with the pivot axis or pin 17. It will be understood that the studs 21, 22 and the respective slots 31, 32, 32a provided with the teeth or steps 41, 42, constitute retaining means for the pivotal arms 9 for retaining the latter in any selected one of a plurality of angular positions relative to the unit about the pivot axis of the arm embodied by the respective pin 17 in the respective slot 18.

It is clear from the foregoing that the imaginary circle on which the lugs 12 of the three pivotal arms 9 can be selectively positioned may have a diameter between a minimum value, roughly equal to the diameter of the inner opening of the ring 4 corresponding to the case of the position III, where each arm 9 is in a tangential position, its concave edge being then coincident with the inner edge 10 of the annular member 8, and a maximum value, in respect of which the arm 9 is spread out to a substantially radial position as is the case of the position II.

The end of each pivotal arm provided with the lug 12 and the nose portion 13 may thus move within a first range of adjustment corresponding to the displacement on the arc of a circle $a_1$ of the end stud 21 in the toothed or stepped slot 31, between the tangential position of the position III and the extreme position of the position I, and within a second range of adjustment defined by the arc of a circle $b_1$ completely located outside the annular member 8 corresponding to the displacement on the arc of a circle $b_2$ of the intermediate stud 22 in the slot 32.

Figure 3:
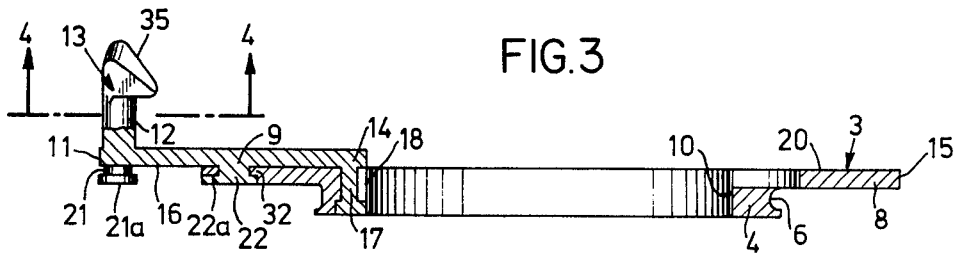
FIG. 3 is a sectional view taken on line 3—3 of FIG. 2.
Figure 4:
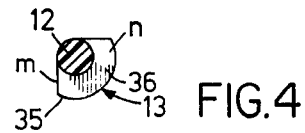
FIG. 4 is a sectional view taken on line 4—4 of FIG. 3.

As can be seen in FIG. 3, each stud 21, 22 has an enlarged head 21a, 22a, which cooperates with a guide slot such as 32 of complementary contour so that the stud is axially retained in its slot.

Owing to the fact that the edge 5 of the flange 1 must be able to hook onto the end nose portion 13 in all angular positions of adjustment of the arms 9 which are included between a tangential position and a radial position, the lug 12 has a cylindrical shape and the nose portion 13 has approximately the shape of a quarter of a cone 35 whose base defines a flat shoulder 36 in the shape of a circular sector which may be retained by its end portions m, n by the flange 1 in the respectively tangential and radial positions of the arm 9.

Having now described my invention, what I claim as new and desire to secure by Letters Patent is:

1. A drive pulley structure, in particular for a distance recorder of a cycle or motorcycle; said pulley structure being fixed coaxially to an outer side of a flange of a wheel hub, said pulley structure comprising a radially outwardly opened grooved ring having an axis, three lugs extending axially of said ring and each lug having a free end portion defining a nose portion engaging both an inner a second side of said flange remote from said outer side relative to said ring and a peripheral portion of said hub flange which peripheral portion has a diameter which may vary from one cycle or motorcycle to another, means for mounting said lugs on said ring comprising a flat annular portion radially outwardly extending from said ring and constituting a unit with said ring, three arms, each arm having inner and outer end portions positioned relative to said ring axis, pivot means on said ring pivotally mounting the inner portion of each arm in a respective one of three circumferentially evenly spaced-apart positions, each position being located on a fixed circle on said unit whereby each arm is angularly adjustable relative to said ring by pivoting about a pivot axis parallel to the axis of said ring, each arm having its outer end portion carrying one of said lugs, and a retaining means for each arm, said retaining means being defined by a first positioning means located on said flat annular portion cooperating with a second positioning means located on said arms and retaining said arms in identical angular positions selected from a plurality of different predetermined angular positions corresponding to different diameters of an imaginary circle which is concentric with the ring and on which imaginary circle the nose portion of each lug is located whereby to engage said nose portions on both said inner side of said flange and on said peripheral portion of said flange thereby maintaining said ring coaxial with said flange.

2. A pulley structure according to claim 1, wherein each arm is pivotally mounted on said unit in a position adjacent an inner edge of the ring.

3. A pulley structure according to claim 1, wherein each arm has a flat shape with first and second sides, said lug extending axially from said first side and said second side being opposed to the lug and in free, angular sliding contact with a planar side of the annular portion the planar side of the annular portion being opposed to the ring, and each arm is angularly slidable on said planar side about the respective pivot means between said plurality of predetermined angular positions.

4. A pulley structure according to claim 1, wherein said retaining means for each arm comprises at least one stud formed on a side of the arm opposed to the lug, a slot provided in said annular portion and having an arcuate shape whose center coincides with said pivot means, said stud being guided by said slot.

5. A pulley structure according to claim 4, wherein said slot is provided with steps for defining said plurality of different predetermined angular positions of adjustment of the corresponding stud and arm.

6. A pulley structure according to claim 4, wherein the stud is provided in the region of the lug.

7. A pulley structure according to claim 4, wherein the stud is provided in an intermediate position between said inner and outer end portions of the arm.

8. A pulley structure according to claim 7, comprising, a second slot provided in said annular portion and located on a side of said pivot means opposed to the first-mentioned slot, said second slot corresponds to a range of adjustment of the corresponding lug between two peripheral edges of said unit and said first-mentioned slot corresponds to a range of adjustment radially outside said unit.

9. A pulley structure according to any one of the claims 4 to 8, wherein each stud comprises an enlarged head which cooperates with a complementary contour of the slot so that the stud is axially retained in the slot.

10. A pulley structure according to any one of the claims 1 to 8, wherein each arm has a concave side edge that coincides with an inner peripheral edge of said unit for a tangential position of the arm side edge, the tangential position corresponds to a radially innermost position of the respective lug.

11. A pulley structure according to any one of the claims 1 to 8, wherein each nose portion has a shape which defines a flat shoulder engaging both said inner side of the flange and said peripheral portion of the flange in all positions of angular adjustment of the respective arm.

12. A pulley structure according to claim 11, wherein said shoulder has a shape of a sector of a circular disc.

* * * * *